(12) United States Patent
Bartlett

(10) Patent No.: US 9,859,753 B2
(45) Date of Patent: Jan. 2, 2018

(54) ELECTRICAL CONTROL SYSTEM AND METHOD

(71) Applicant: Sane Pty Ltd, Eastern Heights (AU)

(72) Inventor: Timothy Richard Bartlett, Eastern Heights (AU)

(73) Assignee: Sane Pty Ltd, Eastern Heights, Queensland (AU)

( * ) Notice: Subject to any disclaimer, the term of this patent is extended or adjusted under 35 U.S.C. 154(b) by 198 days.

(21) Appl. No.: 14/780,551

(22) PCT Filed: May 2, 2014

(86) PCT No.: PCT/AU2014/000493
§ 371 (c)(1),
(2) Date: Sep. 27, 2015

(87) PCT Pub. No.: WO2014/179826
PCT Pub. Date: Nov. 13, 2014

(65) Prior Publication Data
US 2016/0056668 A1    Feb. 25, 2016

(30) Foreign Application Priority Data
May 7, 2013    (AU) .............................. 2013901714

(51) Int. Cl.
*H02J 3/14*    (2006.01)
*H02J 13/00*    (2006.01)
(Continued)

(52) U.S. Cl.
CPC .............. *H02J 13/00* (2013.01); *G05B 15/02* (2013.01); *H02J 4/00* (2013.01); *H02J 13/0017* (2013.01);
(Continued)

(58) Field of Classification Search
CPC ....... H03M 1/662; H03M 1/682; H03M 1/765
See application file for complete search history.

(56) References Cited

U.S. PATENT DOCUMENTS 4,751,498 A    6/1988  Shalvi et al.
2007/0290891 A1*  12/2007  Kato ..................... H03M 11/24
341/22
(Continued)

FOREIGN PATENT DOCUMENTS

| DE | 3907432 A1 | 9/1990 |
| EP | 0088524 a1 | 9/1983 |
| EP | 2482153 A1 | 8/2012 |

OTHER PUBLICATIONS

Supplementary European Search Report dated Feb. 20, 2017 issued on EP 14 79 4284.
(Continued)

*Primary Examiner* — Sibin Chen
(74) *Attorney, Agent, or Firm* — Eagar & Martin Pty Ltd

(57) ABSTRACT

A system for controlling an appliance enables electrical circuits to be wired up more quickly, and electrical circuits to be reconfigured more easily. The electrical control system including a central control unit; one or more switch units connected in series forming a loop, the loop including a first end and a second end, wherein the first end and the second end of the loop are connected to the central control unit; and one or more appliance controllers connected to a respective appliance and in communication with the central control unit; wherein one or more electrical parameters are measured at the first end of the loop, and the central control unit sends a control code associated with the one or more electrical parameters to the one or more appliance controllers.

16 Claims, 6 Drawing Sheets

(51) Int. Cl.
*H02J 4/00* (2006.01)
*G05B 15/02* (2006.01)

(52) U.S. Cl.
CPC ............. *G05B 2219/25011* (2013.01); *G05B 2219/25117* (2013.01); *G05B 2219/2642* (2013.01); *H02J 3/14* (2013.01); *H02J 2003/143* (2013.01); *Y02B 70/3241* (2013.01); *Y02B 70/3266* (2013.01); *Y02B 90/2607* (2013.01); *Y04S 20/227* (2013.01); *Y04S 20/242* (2013.01); *Y04S 40/12* (2013.01)

(56) References Cited

U.S. PATENT DOCUMENTS

2010/0301772 A1* 12/2010 Hahnlen ............ H05B 37/0209
315/297
2011/0109164 A1 5/2011 Suhura et al.

OTHER PUBLICATIONS

"Simple Multiplexing Hand-Held Control Unit", NTIS Tech Notes, Mar. 1, 1990, p. 231, XP000127247, ISSN: 0889-8464.

* cited by examiner

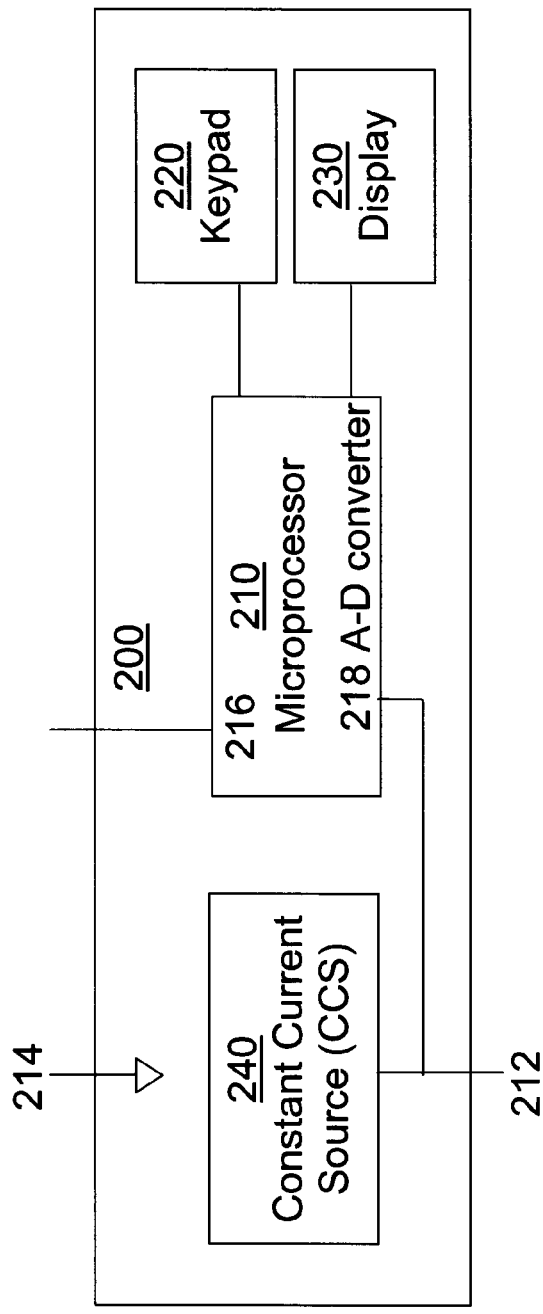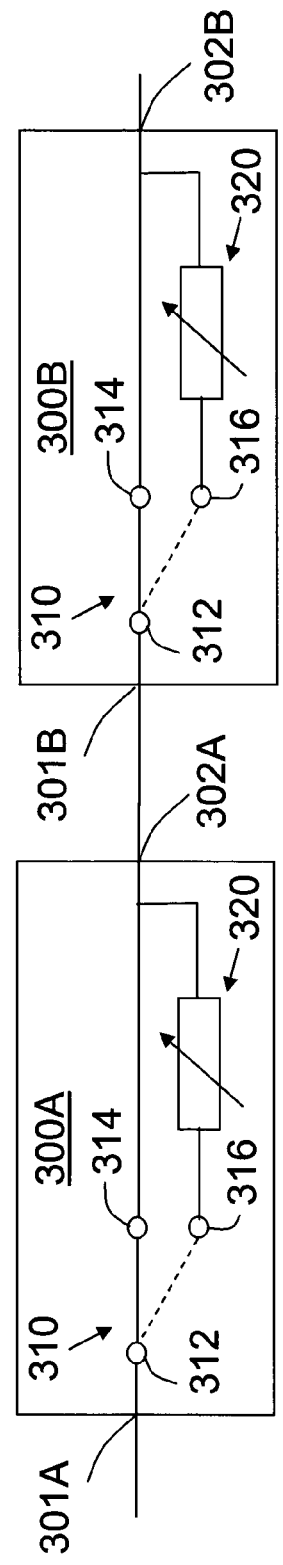
FIG. 2
FIG. 3

600

610. Measuring one or more voltages at a first end of a loop, the loop including one or more switch units connected in series.

620. Determining a control code associated with the one or more voltages.

630. Sending the control code to one or more appliance controllers.

640. Receiving the control code at the one or more appliance controllers

650. Controlling the appliance connected to the appliance controller according to the control code.

FIG. 6

ELECTRICAL CONTROL SYSTEM AND METHOD

FIELD OF THE INVENTION

This invention relates generally to an electrical control system and method and in particular to an electrical control system and method for controlling one or more appliances, for example a light.

BACKGROUND TO THE INVENTION

Typically 300 m of electrical cable is required to wire the electrical circuits of an average three bedroom house in Australia. Even more cable is needed to wire up lighting circuits, when lights are controlled by more than one switch. As a result it generally takes an electrician 60% to 70% longer to wire up lighting circuits than to wire up all other electrical circuits. Furthermore switches often have too little space to safely accommodate more than two cables. In addition, should it be necessary to reconfigure existing switches in order to control a different light, for example following a renovation, it is necessary to install new wiring. However, new wiring is often routed in a wall cavity thus installation of new wiring is often more difficult.

In order to be able to more conveniently reconfigure and control lighting circuits, systems have been developed such as the C-BUS® system developed by Clipsal, a subsidiary of Schneider Electric (Australia) Pty Ltd. In addition, the C-BUS® system can be used to control other electrical devices in a home such as air conditioners, irrigation systems, and multimedia systems. In a lighting system, the C-BUS® system uses a separate Category 5 control cable wired to each switch from a central location, providing an intrinsically safe connection to the switch. In addition, power is routed and controlled to each light from the central location. However, as the power cable and the control cable are both routed from a central location, significantly more cable may be required to wire up an average sized home.

There is therefore a need for an improved electrical control system and method.

The reference to any prior art in this specification is not, and should not be taken as, an acknowledgement or any form of suggestion that the prior art forms part of the common general knowledge in Australia or elsewhere.

OBJECT OF THE INVENTION

It is an object, of some embodiments of the present invention, to provide consumers with improvements and advantages over the above described prior art, and/or overcome and alleviate one or more of the above described disadvantages of the prior art, and/or provide a useful commercial choice.

SUMMARY OF THE INVENTION

In one form, although not necessarily the only or broadest form, the invention resides in an electrical control system for controlling an appliance, the electrical control system including:
a central control unit;
one or more switch units connected in series forming a loop, the loop including a first end and a second end, wherein the first end and the second end of the loop are in communication with the central control unit; and
one or more appliance controllers connected to a respective appliance and in communication with the central control unit;
wherein one or more electrical parameters are measured at the first end of the loop, and the central control unit sends a control code associated with the one or more electrical parameters to the one or more appliance controllers.

Preferably, the electrical parameter is one or more voltages.

Preferably, the loop is connected to the central control unit.

Preferably, the loop or a second loop is connected to the appliance controller, and the appliance controller measures one or more electrical parameters at the first end of the loop or the second loop, and sends a signal associated with the one or more electrical parameters to the central control unit.

Preferably, each of the one or more voltages is associated with an activation of a respective switch unit. Preferably, each of the one or more voltages is measured consecutively.

Preferably, consecutive voltages are measured within a predetermined period of time.

Preferably, the system includes a constant current source connected to the first end of the loop. Preferably, the second end of the loop is connected to ground.

Preferably, each of the one or more switch units includes a resistance. Preferably the resistance of each of the one or more switch units is unique. Preferably a constant current of the constant current source is passed through the resistance which induces a voltage across the loop and hence each of the one or more voltages is measured at the first end of the loop.

Each switch unit may include a momentary single pole, double throw switch connected to the resistance. A first position of the single pole double throw switch is normally closed. The resistance may be switched in when the single pole double throw switch is in a second position. The second position is activated when a user activates the momentary single pole, double throw switch. In addition, the resistance may be variable or selectable.

Suitably, the control code includes an identification code, and/or a function code. Preferably, the identification code is sent before the function code. The appliance controller may perform a pre-determined function when the identification code equals an appliance controller code of the appliance controller. Alternatively, the appliance controller may perform a function according to the function code when the identification code is equal to an appliance controller code. In one embodiment, the function code is the same as the identification code.

Preferably, the voltage of the loop is an intrinsically safe low voltage.

Suitably, the appliance is a light, a power point, a fan, a home theatre system or any suitable electrical appliance.

In another form, the invention resides in an electrical control method for controlling an appliance, the method including the steps of:
measuring one or more electrical parameters at a first end of a loop, the loop including one or more switch units connected in series;
determining a control code associated with the one or more electrical parameters;
sending the control code to one or more appliance controllers;
receiving the control code at the one or more appliance controllers; and
controlling the appliance connected to the appliance controller according to the control code.

Preferably, the electrical parameter is a voltage.

Preferably, each of the one or more voltages is associated with an activation of a respective switch unit.

Preferably, the one or more voltages are measured within a predetermined period of time.

Preferably, the method includes the step of determining a switch code associated with the measured voltage.

Preferably, the method includes the step of supplying a current to the loop from a constant current source. Suitably, the constant current is supplied to the first end of the loop.

BRIEF DESCRIPTION OF THE DRAWINGS

An embodiment of the invention will be described with reference to the accompanying drawings in which:

FIG. 2 illustrates a block diagram of a central control unit of the system of FIG. 1;

FIG. 3 illustrates a block diagram of a switch unit of FIG. 1;

FIG. 6 illustrates a flow diagram of an electrical control method according to an embodiment of the present invention.

DETAILED DESCRIPTION OF THE PREFERRED EMBODIMENT

Figure 1:
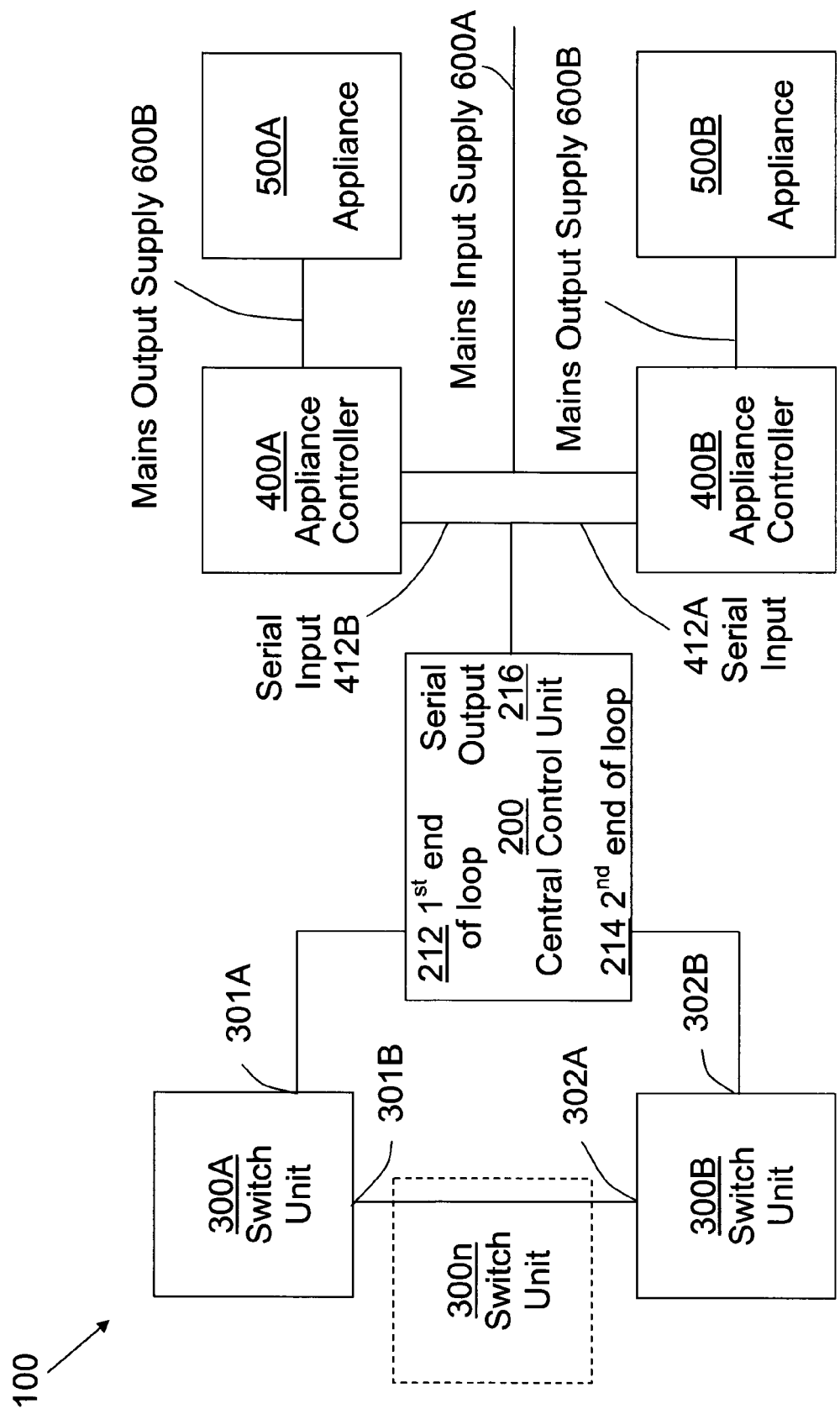
FIG. 1 illustrates a block diagram of an electrical control system according to an embodiment of the present invention.

Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element from another element without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention. It will be appreciated that the invention may be implemented in a variety of ways, and that this description is given by way of example only.

FIG. 1 illustrates a block diagram of an electrical control system 100 according to an embodiment of the present invention. The system 100 includes a central control unit 200, one or more switch units 300A, 300B, 300n and one or more appliance controllers 400A, 400B. Each appliance controller 400A, 400B controls one or more appliances 500A, 500B such as a light. However it should be appreciated that the system 100 may be configured to control a standard power socket, for example, or to control any other suitable appliances 500A, 500B such as a fan, mood lighting or a home theatre system.

The switch units 300A, 300B are connected in series forming a loop. Preferably, the switch units 300A, 300B are connected in series using a single core cable. The loop includes a first end 212 and a second end 214, and each end 212, 214 of the loop is connected to, and in communication with, the central control unit 200. Each switch unit 300A, 300B, is configured to introduce a unique resistance into the loop when activated. When a current is passed through the loop, an electrical parameter, for example a unique voltage, is induced across the loop which is measured by the central control unit 200 at the first end 212 of the loop. The central control unit 200 is configured to output a control code to each appliance controller 400A, 400B, according to the measured unique voltage at the first end of the loop. If none of the switch units 300A, 300B are activated, a voltage at the first end of the loop 212 will be close to zero, thus no control code is sent in this case.

Each appliance controller 400A, 400B controls an appliance 500A, 500B according to the control code received from the central control unit 200. In one embodiment, a mains input supply 600A is switched to a mains output supply 600B connected to a respective light, thus switching the light on or off. However it should be appreciated that the appliance controller 400A, 400B may perform any other suitable function according to the control code.

The present invention allows each appliance controller 400A, 400B to be connected directly to a mains supply independently of the switch units 300A, 300B. Thus an electric circuit is easier to install as connections are not required between the switch unit 300A, 300B and the appliance 500A, 500B, and as a result, less cable is required. In addition, reconfiguring which switch unit 300A, 300B controls which appliance 400A, 400B and a function of the switch unit 300A, 300B can be performed centrally.

FIG. 2 illustrates a block diagram of the central control unit 200 according to an embodiment of the present invention. Referring to FIGS. 1 and 2, the control unit 200 includes a microprocessor 210, a keypad 220, a display 230 and a constant current source 240. The control unit 200 may include an in-built power supply, connected directly to the mains input supply 600A, but could be powered from any suitable power supply (not shown), such as a standard "off-the-shelf" power supply.

The microprocessor 210, for example a microcontroller, may be a single component and in some embodiments includes a processor, an oscillator, Random Access Memory (RAM), an Analogue to Digital (A-D) converter 218, a timer, a comparator, and Read Only Memory (ROM). However a person skilled in the art will realise that the microprocessor 210 may be assembled using individual components connected together. Program code instructions are stored in the RAM and/or the ROM which are executed by the processor.

As previously mentioned, the loop is connected to the central control unit 200 at the first end 212 and the second end 214. The first end 212 of the loop is connected to the Constant Current Source 240 and to the A-D converter 218, and a second end of the loop 214 is connected to ground.

The microprocessor 210, via the A-D converter 218, measures the voltage at the first end 212 of the loop. The microprocessor 210 also includes a serial output 214, which sends the control code to the appliance controllers 400A, 400B according to the measured voltage at the first end 212 of the loop. Although in one embodiment the control code is sent to the appliance controllers 400A, 400B using a serial link, it should be appreciated that the control code may be sent using any suitable means both wired and wireless (for example Zigbee®).

The keypad 220 and the display 230 are used to configure the system 100 to determine which switch units 300A, 300B control which appliance controller(s) 400A, 400B or any other function of the appliance controller(s) 400A, 400B. However it should be appreciated that the central control unit 200 may include a communications module (not shown) that allows the system 100 to be configured using a remote computer. For example, the communications module may be an Ethernet, a Serial, a Cellular, or any other suitable wireless connection. In addition, the control unit 200 may connect to the Internet to allow remote configuration of the system 100, for example using an Application installed on a computer, tablet computer, or smartphone. Further, the central control unit 200 may be configured to control an appliance controller 400A, 400B remotely or by setting timers. In addition, the central control unit 200 may be configured to record when the appliance controllers 300A, 300B are activated. This information may be used to analyse and determine whether energy savings may be made.

The central control unit 200 may be configured such that one or more switch units 300A, 300B control one or more appliance controllers 400A, 400B connected to a respective appliance 500A, 500B. In one example, the central control unit 200 may be configured such that a single switch unit 300A, 300B controls a single appliance controller 400A, 400B connected to a respective appliance 500A, 500B. In another example, the central control unit 200 may be configured such that a single switch unit 300A, 300B controls more than one appliance controller 400A, 400B connected to a respective appliance 500A, 500B. In addition, it should be appreciated that the central control unit 200 may be configured such that more than one switch unit 300A, 300B controls a single appliance controller 400A, 400B, for example when used in two or three way switching of lighting circuits. However it should be appreciated that other combinations are possible.

The constant current source 240 supplies a constant current to the first end 212 of the loop, which induces a voltage across the loop proportional to the resistance of the loop. As the resistance of the loop increases, the voltage drop across the loop increases, and hence the voltage at the first end 212 of the loop increases. In one embodiment, the constant current source 240 supplies a current of 500 µA. However, it should be appreciated that the constant current source 240 may be any suitable current to induce any suitable voltage across the loop. Preferably, a greatest voltage of the constant current source 240 is kept below 48 Vdc, in order to be intrinsically safe according to various electrical safety standards.

FIG. 3 illustrates a block diagram of the switch units 300A, 300B of FIG. 1 according to an embodiment of the present invention. As shown in FIG. 3, each switch unit 300A, 300B includes an input 301A, 301B and an output 302A, 302B respectively. The switch units 300A, 300B are connected in series. In one embodiment, the output 302A of a first switch unit 300A connects to the input 301B of a second switch unit 300B. Although two switch units 300A, 300B are shown, it should be appreciated that any number of switch units 300n may connected in the loop. For example, additional switch units 300n may be connected between a first switch unit 300A, and a second switch unit 300B. Alternatively, additional switch units 300n may be connected between the central control unit 200 and the first switch unit 300A, or between the central control unit 200 and the second switch unit 300B.

In one embodiment, each switch unit 300A, 300B includes a single pole, double throw switch 310 and a variable resistance 320. However it should be appreciated that each switch unit 300A, 300B may include a fixed resistance which is unique to a respective switch unit 300A, 300B in the system 100. It is envisaged that components of the switch unit 300A, 300B will be small enough to fit behind a standard switch wall plate, or be integrated into a switch mechanism of the single pole, double throw switch 310.

The single pole, double throw switch 310 includes a common terminal 312, a first position 314, and a second position 316. The common terminal 312 is connected to the input 301A, 301B of a respective switch unit 300A, 300B. Preferably, the single pole, double throw switch 310 is a momentary switch and is normally closed in the first position 314 when the single pole, double throw switch 310 is released. As shown in FIG. 3, when the single pole, double throw switch 310 is in the first (activated) position 314, a connection between an input 301A, 301B and an output 302A, 302B of a respective switch unit 300A, 300B is a short circuit.

When a user of the switch unit 300A, 300B presses the single pole, double throw switch 310, the single pole, double throw switch 310 moves to the second position 316, as shown in FIG. 3 by dotted lines. When the single pole, double throw switch 310 is moved to the second position 316 the variable resistance 320 (or fixed unique resistance) is connected between the input 301A, 301B and the output 302A, 302B of a respective switch unit 300A, 300B.

Figure 4B:
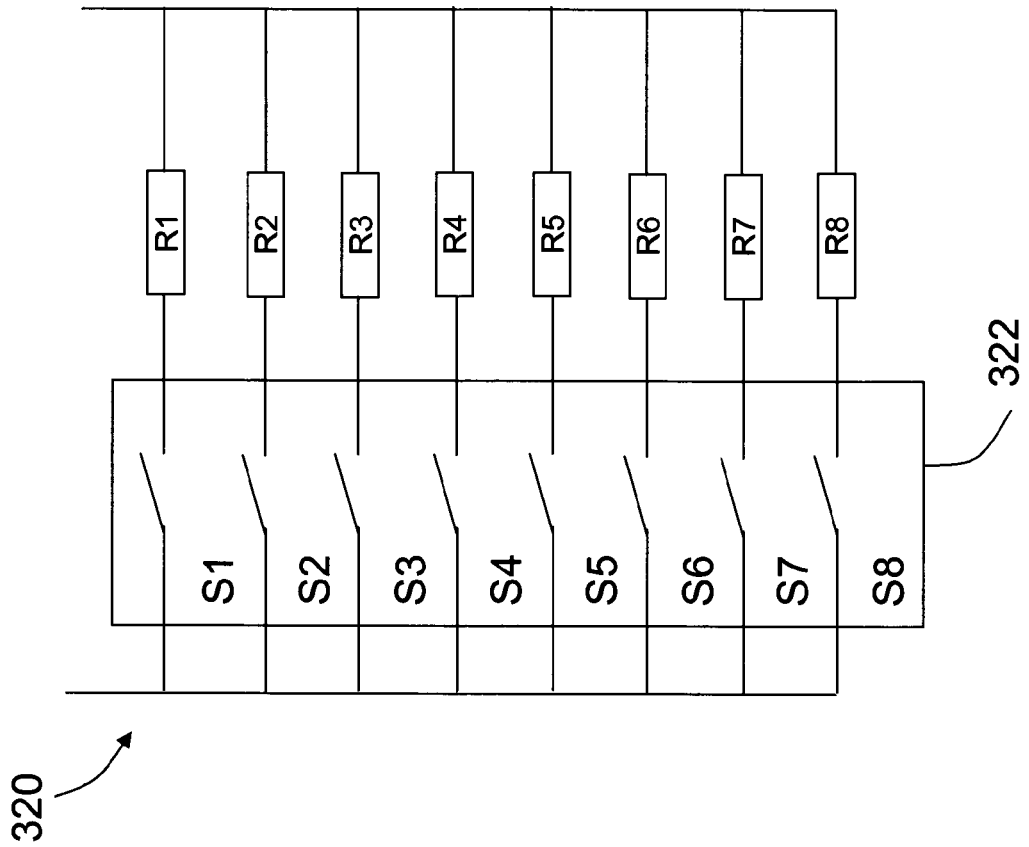
FIG. 4B illustrates a block diagram of a second embodiment of a variable resistance of the switch unit of FIG. 3.
Figure 4A:
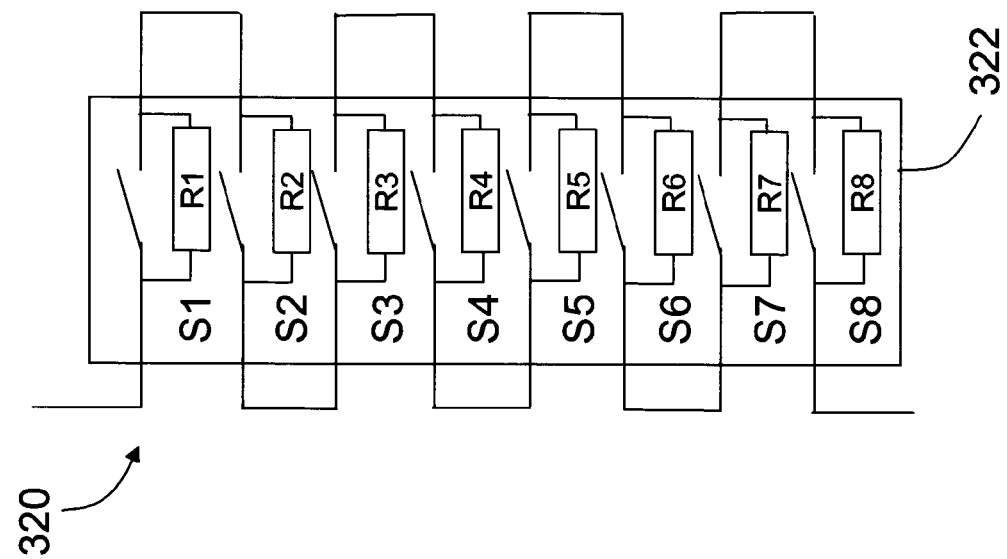
FIG. 4A illustrates a block diagram of a first embodiment of a variable resistance of the switch unit of FIG. 3.

FIG. 4A illustrates a block diagram of a first embodiment of the variable resistance 320 of the switch unit 300A, 300B of FIG. 3, and FIG. 4B illustrates a block diagram of a second embodiment of the variable resistance 320 of the switch unit 300A, 300B of FIG. 3.

As shown in the embodiment of FIG. 4A, the variable resistance 320 includes an eight-way, Dual In-line Package (DIP) switch 322, and eight discrete values of resistor R1 . . . R8. Each switch S1 . . . S8 of the DIP switch 322 is connected in series, and each resistor R1 . . . R2 is connected across a respective switch S1 . . . S8. This configuration allows a selection of resistors R1 . . . R8 to be connected in series.

Referring to FIG. 4B, inputs of switches S1 . . . S8 of the DIP switch 322 are connected together and each resistor R1 . . . R8 is connected to an output of a respective switch S1 . . . S8. In addition, opposite ends of each resistor R1 . . . R8 to the switch S1 . . . S8 are connected together, which allows a selection of resistors to be connected in parallel.

Although two embodiments of the variable resistance 320 are shown in FIGS. 4A and 4B, it should be appreciated that the variable resistance 320 may be constructed using a variety of components. For example the variable resistance 320 may be an "off the shelf part" or use dials rather than DIP switches. In addition, although in the embodiments of FIGS. 4A and 4B, 256 combinations of resistance are possible with an 8-way DIP switch, a person skilled in the art will realise that more than 256 combinations are possible using more resistors and more individual switches of the DIP switch.

The DIP switch 322 also serves to provide a switch code for a respective switch unit 300A, 300B. Each of the switch units 300A, 300B is configured with a different resistance and hence switch code by setting switches S1 . . . S8 of a respective DIP switch 322 to either ON (a binary '1') or OFF (a binary '0'). Exemplary values of each resistor R1 . . . R8, and an associated switch S1 . . . S8 of the DIP switch 322, are shown in Table 1 below. It should be noted that the values of resistor are not standard and are selected for simplicity only:

TABLE 1

| Resistor | Value (kohms) | Switch S1 . . . S8 of DIP switch 322 |
|---|---|---|
| R1 | 1 | 1 |
| R2 | 2 | 2 |
| R3 | 4 | 3 |
| R4 | 8 | 4 |
| R5 | 16 | 5 |
| R6 | 32 | 6 |
| R7 | 64 | 7 |
| R8 | 128 | 8 |

The values of the resistors R1 . . . R8 are chosen to provide an equal voltage spread measured at the first end 212 of the loop for a chosen constant current source 240.

Although in theory the voltage measured at the first end 212 of the loop is constant for a given resistance and current, it should be appreciated that the voltage across the loop may vary due to variations in the resistor values, and variations in the constant current source. Thus the central control unit 200 may be configured to take into account for these variations, by sending a control code to an appliance controller 400A, 400B according to a voltage range measured at the first end 212 of the loop. In addition, the central control unit 200 may be configured to provide a gap between each consecutive voltage range in order to reduce any false readings. For example, each switch unit 300A, 300B includes 256 discrete values of resistance associated with a discrete voltage. Assuming that the 256 discrete values are evenly distributed across 48 Vdc, for example, for 256 steps (or switch codes) the voltage increases by 0.1875 Vdc per step. Thus the voltage is equal to:

step number×0.1875 Vdc(+/−0.09 Vdc)

Thus a first voltage range would be:

1×0.1875(+/−0.04)=0.0975 Vdc to 0.2775 Vdc

Similarly, a second voltage range would be:

2×0.1875(+/−0.09)=0.375(+/−0.09)=0.285 Vdc to 0.465 Vdc

Thus the gap between consecutive voltage (first and second) ranges is:

0.285 Vdc−0.2775=0.0075 Vdc.

In one embodiment, the central control unit 200 may be configured to automatically set the voltage ranges, and gap voltage ranges. In this embodiment, the central control unit 200 is set in a configuration mode via a graphical user interface (GUI) installed on a mobile computing device. When a switch unit 300A, 300B is activated, the central control unit 200 measures the voltage at the first end 212 of the loop, and automatically assigns a voltage range for the activated switch unit 300A, 300B. In addition, the central control unit 200 can provide a warning if two switch units 300A, 300B induce a same or a similar voltage at the first end 212 of the loop, and prompt the user to change the switch code or make another suitable adjustment.

Referring to the variable resistance 320 of FIG. 4A, if all switches S1 . . . S8 are in the OFF or open position (or a binary '0'), all of the resistors R1 . . . R8 are switched into the circuit, thus the value of the variable resistor 320 and the resistance of the loop will be 1+2+4+8+16+32+64+128=255 kohms, or a maximum resistance.

In one embodiment, the first switch unit 300A is set to a code of binary 00000001 (decimal 1), thus R1 is shorted out by S1 and the value of the variable resistor 320 will be 0+2+4+8+16+32+64+128=254 kohms. Similarly if the second switch unit 300B is set a code of binary 00000010 (decimal 2), R2 will be shorted out by S2, and the value of the variable resistor 320 will be 1+0+4+8+16+32+64+128=253 kohms.

In a further example, if the DIP switch 322 is set to a value of 00001111, R1 will be shorted out by S1, R2 will be shorted out by S2, R3 will be shorted out by S3, and R4 will be shorted out by S4. Thus the value of the variable resistance 320 will be 0+0+0+0+16+32+64+128=240 kohms.

Figure 5:
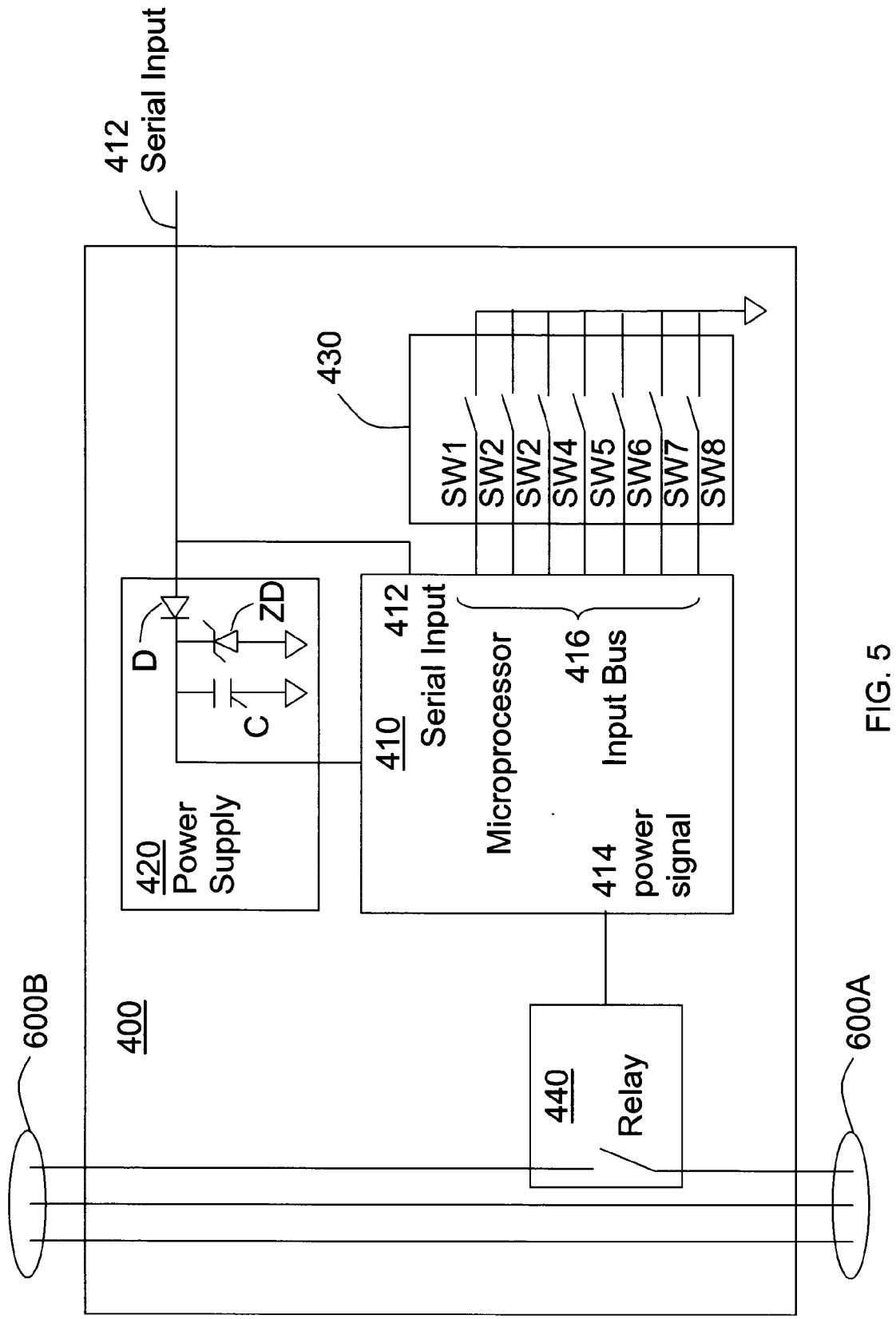
FIG. 5 illustrates a block diagram of an appliance controller of the system of FIG. 1.

FIG. 5 illustrates a block diagram of an appliance controller 400 according to an embodiment of the present invention. It is envisaged that the appliance controller 400 will be small enough to fit inside a connection to the appliance 500A, 500B, or in the appliance 500A, 500B itself. For example the appliance controller 400A, 400B may fit inside a ceiling rose of a light fitting or inside the light fitting itself.

As shown in FIG. 5, the appliance controller 400 includes a microprocessor 410, a power supply 430, a relay 440 and optionally a DIP switch 420.

The microprocessor 410 is similar to the microprocessor 210 of the central control unit 200. The microprocessor 410 may be a single component including a processor, an oscillator, Random Access Memory (RAM), an analogue to digital controller (A-D), a timer, a comparator and Read Only Memory (ROM). However a person skilled in the art will realise that the microprocessor 410 may be assembled using individual components connected together. Similar to the central control unit 200, the RAM and/or ROM includes program code instructions which are executed by the processor.

The microprocessor 410 includes a serial input 412, which receives the control code from the central control unit 200. However, it should be appreciated that the control code may be communicated using any suitable wired or wireless communications, such as Zigbee®. In addition, the microprocessor 410 includes a driver signal 414 which connects to the relay 440, and an input bus 416 which connects to the optional DIP switch 430.

In one embodiment, the DIP switch 430 sets an appliance controller code of the appliance controller 400A, 400B. However it should be appreciated that the appliance controller code may be set in firmware/software of the appliance controller 400A, 400B. The DIP switch 420 may be an 8-way DIP switch including individual switches SW1 . . . SW8. An input of each switch SW1 . . . SW8 is connected to a respective input of the input bus 416 of the microcontroller 410, and an output of each switch SW1 . . . SW8 is connected to ground. In one embodiment SW1 is the least significant bit, and SW8 is the most significant bit.

In one example, switch SW1 may be set to ON (closed) and the remaining switches SW2 . . . SW7 may be set to OFF (open), thus the appliance controller code is 11111110 (decimal 254). Similarly, if switch S2 is set to ON and the remaining switches S1, S3 . . . S8 are set to OFF, the appliance controller code is 11111101 (decimal 253).

In one embodiment, the control code includes an identification code. In this embodiment, the appliance 400A, 400B performs a predetermined function when the identification code received on the serial input 412 is equal to the appliance controller code. In one embodiment, the identification code is a serial signal which is stored in a buffer by the microprocessor 410 and compared to the appliance controller code.

A driver signal 414 from the microcontroller 410 connects to and controls the relay 440. In one embodiment when the identification code equals the appliance controller code, the relay 440 controls a live line of a mains output supply 600B in order to switch the appliance 500A, 500B on or off.

Although in one embodiment the appliance controller 400A, 400B switches the mains input supply 600A on or off, it will be appreciated that the appliance controller 400A, 400B may be configured to pulse the mains output supply 600B to vary power to the appliance 500A, 500B, for example to dim a light when a control code is received.

In addition, the appliance controller 400A, 400B may be configured to perform additional functions in response to the control code. In one embodiment, the control code includes an identification code and a function code sent consecutively. The identification code is sent first followed by the function code. When the identification code is received by the appliance controller 400A, 400B, the appliance controller 400A, 400B compares the identification code with the appliance controller code. If the identification code and the appliance controller code are equal, the appliance controller 400A, 400B determines if one or more function codes are sent within a pre-determined period of time, for example 500 ms of the identification code. If one or more function codes are received, the appliance controller 400A, 400B performs one or more functions according to the function code.

In one embodiment, the function code may be the same as the identification code, for example to control a fan. In this case, a user may press a same switch unit 300A, 300B several times consecutively to change the speed of the fan. For example, the user may press the switch unit 300A, 300B once to switch the fan on, or twice within a predetermined period of time to change a speed of the fan.

Although in one embodiment, the same switch unit 300A, 300B is activated within the predetermined period of time, it should be appreciated that different switch units 300A, 300B may be activated within the pre-determined period of time in order to change the speed of the fan or perform another function. For example by activating a first switch unit followed by a second switch unit may activate a first speed. Activating a first switch unit followed by a third switch unit may activate a second speed, and activating a first switch unit followed by a fourth switch unit may activate a third speed.

In another exemplary embodiment, a first appliance controller 400A is configured to control a heating level of an element type heater. The appliance controller 400A, may be connected to the element type heater via a power outlet for example. In this embodiment, two switch units 300A, 300B may be used. The first switch unit 300A induces a first voltage across the loop when activated, which is measured at the first end 212 of the loop. A second switch unit 300B induces a second voltage across the loop when activated, which is measured at the first end 212 of the loop. The central control unit 200 is configured to send a first control code to all appliance controllers 400A, 400B in response to the first voltage when the first switch unit 300A is activated. In addition, the central control unit 200A is configured to send a second control code to all appliance controllers 400A, 400B in response to the second voltage when the second switch unit 300B is activated.

The first control code includes an identification code, followed by a first function code within a pre-determined period of time, and the second control code includes an identification code, followed by a second function code within a pre-determined period of time. In response, the appliance controller 400A determines if the identification code is equal to the appliance controller code of the first appliance controller 400A. If the appliance controller code and the identification code are equal, the first appliance controller 400A determines whether a function code is sent within a pre-determined period of time. If so, in response to the first function code, the first appliance controller 400A may be configured to increase the heating level of an element type heater, and in response to the second function code, the first appliance controller 400A may be configured to decrease the heating level of an element type heater.

In another embodiment, each appliance controller 400A, 400B may also include an electro acoustic device (not shown), such as a piezo-electric buzzer or a speaker, connected to the microprocessor 410 of the appliance controller 400A, 400B. The electro acoustic device allows a user to trace a desired appliance controller 400A, 400B. In order to trace an appliance controller 400A, 400B, the central control unit 200 is configured to send the identification code of the desired appliance controller 400A, 400B, followed by a function code that instructs the desired appliance controller 400A, 400B to sound the electro acoustic device. For example the central controller unit 200 is configured to send the identification code of the desired appliance controller 400A, 400B, followed by a function code that instructs the desired appliance controller 400A, 400B to sound the electro acoustic device as an alarm in response to a smoke detector interfaced to the central controller 200.

In one embodiment, the power supply 420 utilises a parasitic method of deriving power from the serial input 412 connecting the microprocessor 410 to the central control unit 200 to power the microprocessor 410. In an exemplary embodiment, a parasitic voltage charges up a capacitor C, and the voltage is regulated by a zener diode ZD. A diode D prevents a reverse voltage entering the serial input 412, and the serial input 412 also connects to the microprocessor 410. Alternatively, the appliance controller 400A, 400B may also include a power supply (not shown) connected to the mains input supply 600A in order to power the appliance controller 400A, 400B.

In yet another embodiment, the central control unit 200 and/or the appliance controller 300A, 300B may be configured to switch on or off a connected appliance 500A, 500B when the power is restored after a power cut. For example, the central control unit 200 and/or the appliance controller 300A, 300B may be configured to switch on appliances that have been configured as emergency lighting. In another example, the central control unit 200 and/or the appliance controller 300A, 300B may be configured to prevent a refrigerator, freezer or air conditioner from powering on for a period of time when the electricity supply is suffering from power quality issues or during an electrical storm.

In another embodiment, the appliance controller 300A, 300B may be switched using a remote control. In this embodiment, the appliance controller 300A, 300B includes a radio receiver. In response to a signal received from the remote control at the radio receiver, the appliance controller 300A, 300B may control the respective appliance 500A, 500B. For example to switch a light on or off.

In use, an electrician connects up the system 100 in accordance with the block diagram of FIG. 1. The control unit 200 is located in a suitable location of a premise. Each of the switch units 300A, 300B are connected in series to form a loop, and each end of the loop is connected to the central control unit 200. In addition each of the switch units 300A, 300B has a unique switch code.

Similarly, each of the appliance controllers 400A, 400B has a unique appliance controller code, and the serial inputs 412A, 412B are connected to the serial output 214 of the central control unit 200. Alternatively, the serial inputs 412A, 412B may be connected in a daisy chain. For example the serial input 412A of a first appliance controller 400A may connect to the serial input 412B of a second appliance controller 400B or any other appliance controller in circuit.

The central control unit 200 is then configured to associate each measured voltage with a control code. The control code is sent to all appliance controllers 400A, 400B which controls the appliance 500A, 500B in accordance with the control code.

In another embodiment, the communications between the central control unit 200 and each of the appliance controllers 400A, 400B is bidirectional. This allows the central control unit 200 to identify status information of all of the appliance controllers 400A, 400B and provide the status information to a user via a Graphical User Interface on a remote computer or on a screen (not shown) of the central control unit 200.

The central control unit 200 may also be configured to run third party applications, such as sensing and proximity functions. Third party firmware running central control unit 200 may include a product activation key which may be purchased from the third party application provider by the user.

FIG. 6 illustrates a flow diagram of an electrical control method according to an embodiment of the present invention. At step 610, the central control unit 200 measures one or more voltages at a first end of the loop, the loop including one or more switch units 300A, 300B connected in series. At step 620, the central control unit 200 determines a control code associated with the one or more voltages, and at step 630, the central control unit 200, sends the control code to the one or more appliance controllers 400A, 400B. At step 640, the one or more appliance controllers 400A, 400B receive the control code. Finally at step 650, each appliance controller 400A, 400B controls the appliance 500A, 500B connected to the appliance controller 400A, 4006 according to the control code.

Figure 7:
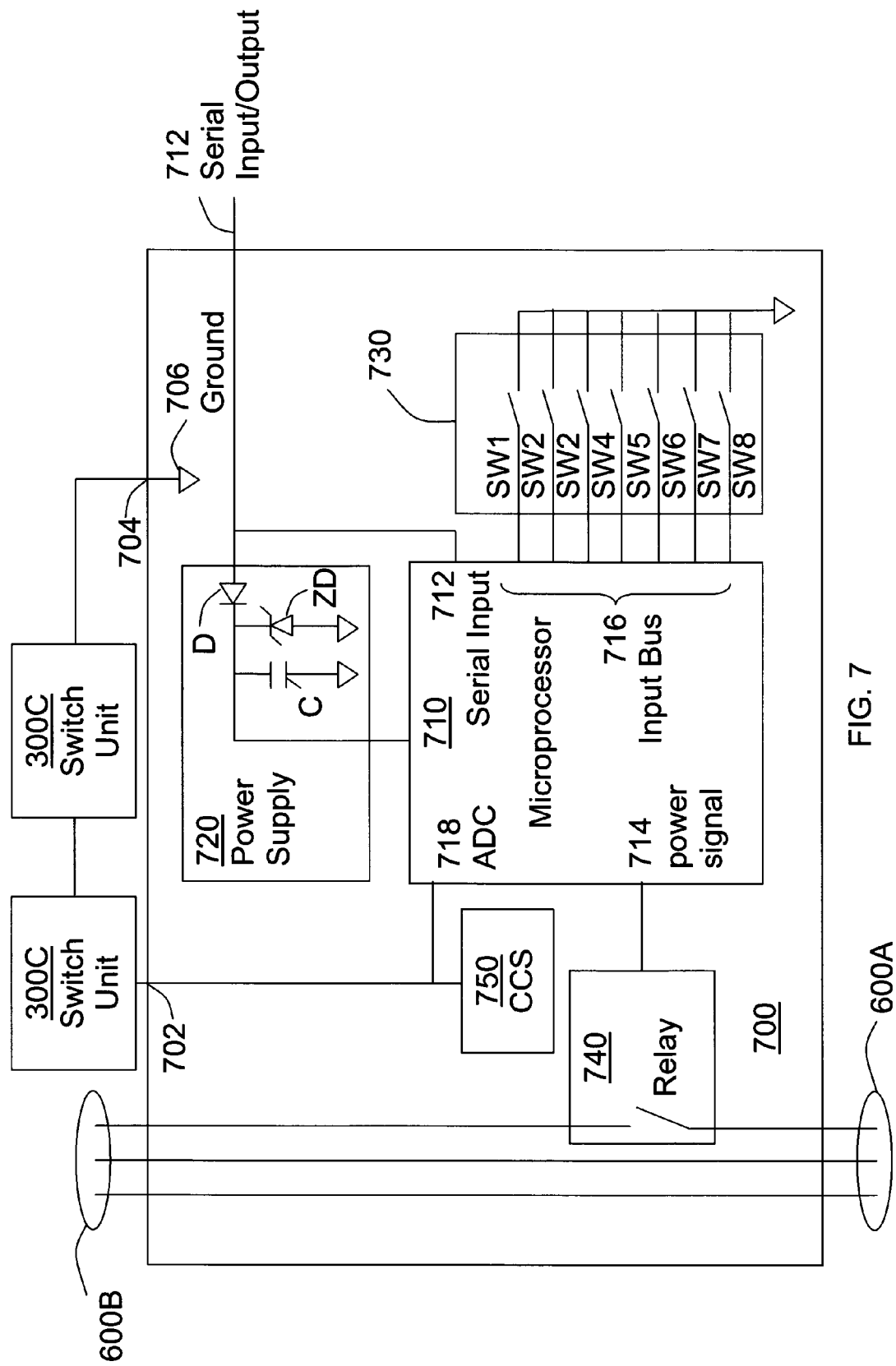
FIG. 7 illustrates a block diagram of a second embodiment of an appliance controller, according to an embodiment of the present invention.

In another embodiment, the one or more of the appliance controllers may also include a constant current source (CCS) for connecting to a second loop, in effect allowing the loop of FIG. 1 to be extended. FIG. 7 illustrates a block diagram of a second embodiment of an appliance controller 700 according to an embodiment of the present invention. Similar to the embodiment shown in FIG. 1, the second loop includes a number of switch units 300C, 300D connected in series. Although only two switch units 300C, 300D are connected in series, it should be appreciated that any number of switch units may be connected.

The appliance controller 700 is similar to the appliance controller 400 of FIG. 5 and includes a microprocessor 710, a power supply 720, a relay 740 and optionally a DIP switch 730 connected to an input bus 716 of the microprocessor 710. The second loop includes a first end 702 and a second end 704. The first end 702 of the second loop is connected to a constant current source 750 and to an A-D Converter (ADC) 718 of the microprocessor 718. The second end 704 of the second loop is connected to ground 706. The microprocessor 710 measures a voltage at the first end 702 of the second loop and sends a signal to the central controller 200 via a Serial input/output 712 (or any suitable connection) in accordance with the measured voltage associated with a switch unit 300C, 300D. The signal is sent to the central control unit 200, and the central control unit 200 is configured to output a control code to each appliance controller 400A, 400B, according to the signal, and hence the measured unique voltage at the first end 702 of the second loop.

In summary, the electrical control system and method provides, according to some embodiments, the following advantages:

1) Less cable is required to wire up a lighting circuit, as there is no requirement to provide live switch wires, multiple cables to be installed in wall cavities or long runs of multi-core cables back to a central point, making electrical circuits easier to install;

2) A single core intrinsically safe cable is routed to each switch unit, again requiring less cable over prior art systems. Furthermore connections to a switch are not made difficult with multiple cables;

3) Less time is required to wire up a lighting circuit as mains power is only routed to the lights, not to the switches;

4) The loop uses simple analogue signals;

5) The switch units can be easily reconfigured to control different appliances, or multiple appliances.

6) The switch units are intrinsically safe; and

7) The system can be configured to control simple appliances such as a light, to complex appliances such as sprinkler system, cooling and heating appliances, home theatre and mood lighting.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. An electrical control system for controlling an appliance, the electrical control system including:
a central control unit;
one or more momentary switch units connected in series with the central control unit to form a loop, the loop including a first end and a second end, wherein the first end and the second end of the loop are in communication with the central control unit;
one or more appliance controllers in communication with the central control unit; and
a constant current source connected to the first end of the loop and the second end of the loop connected to ground,
wherein the central control unit is configured to measure one or more electrical parameters at the first end of the loop, and the central control unit is configured to associate each electrical parameter with a control code, and to send the control code to the one or more appliance controllers.

2. The system of claim 1, wherein the one or more electrical parameters are one or more voltages.

3. The system of claim 2 wherein each of the one or more voltages is associated with an activation of a respective switch unit.

4. The system of claim 3 wherein each of the one or more voltages is measured consecutively.

5. The system of claim 4 wherein the consecutive voltages are measured within a predetermined period of time.

6. The system of claim 1, wherein the, or each of the switch units includes a resistance, and the, or each, switch unit is configured to connect the resistance into the loop on activation.

7. The system of claim 6 wherein a constant current of the constant current source is passed through the resistance which induces a voltage across the loop and hence each of the one or more voltages measured at the first end of the loop.

8. The system of claim 6, wherein each switch unit includes a single pole, double throw switch connected to the resistance, each switch unit including a common terminal, a first position, and a second position, with a short circuit between an input and an output of the switch being provided when the switch is in the first position and the resistance being connected between the input and the output when the switch is in the second position.

9. The system of claim 8, wherein the first position of the single pole double throw switch is a normally closed position.

10. The system of claim 1 wherein the control code includes an identification code, and/or a function code.

11. The system of claim 10 wherein the identification code is sent before the function code.

12. The system of claim 10 wherein the function code is the same as the identification code.

13. The system of claim 1 wherein the voltage of the loop is an intrinsically safe low voltage.

14. An electrical control method for controlling an appliance, the method including the steps of:
  connecting a first end of a loop to a constant current source and a second end of the loop to ground;
  measuring one or more electrical parameters at the first end of the loop, the loop including one or more momentary switch units connected in series with a central control unit;
  associating a control code with the one or more electrical parameters; and
  sending the control code to one or more appliance controllers.

15. The method of claim 14, wherein the one or more electrical parameters are one or more voltages.

16. The method of claim 15 wherein each of the one or more voltages is associated with an activation of a respective switch unit.

* * * * *